UNITED STATES PATENT OFFICE.

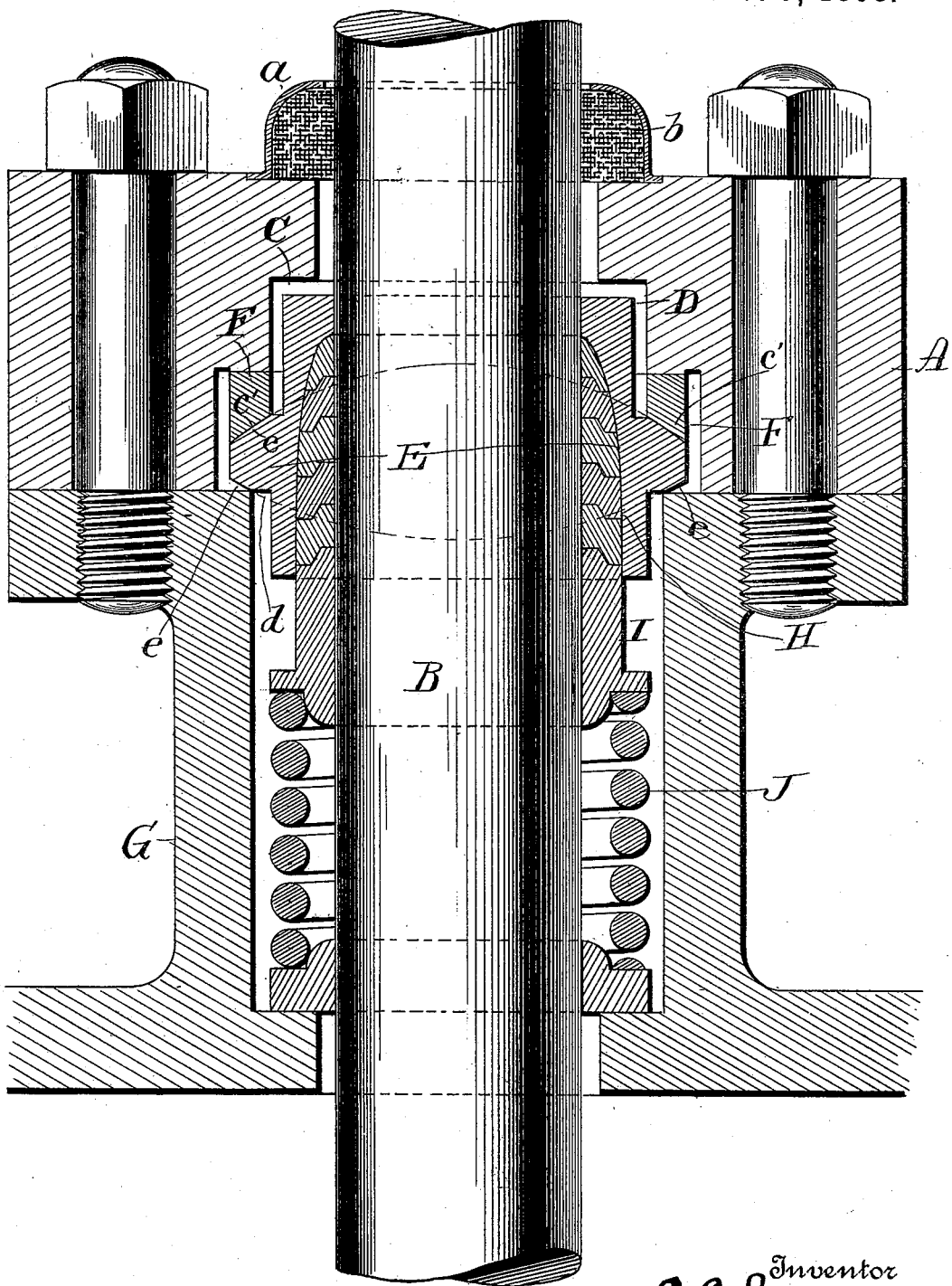

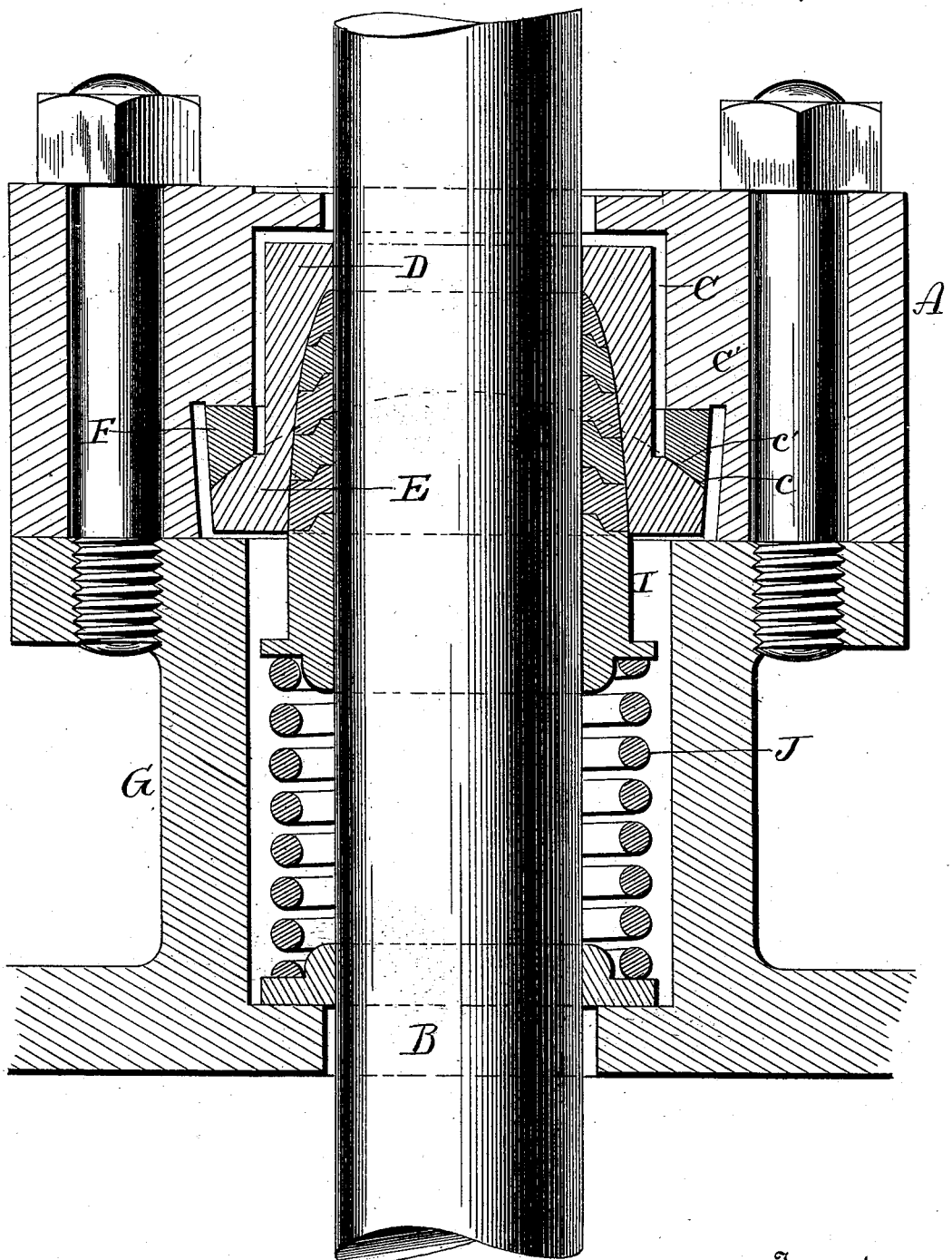

CHARLES C. JEROME, OF CHICAGO, ILLINOIS.

PISTON-ROD PACKING.

SPECIFICATION forming part of Letters Patent No. 508,139, dated November 7, 1893.

Application filed April 21, 1893. Serial No. 471,449. (No model.)

*To all whom it may concern:*

Be it known that I, CHARLES C. JEROME, a resident of Chicago, in the county of Cook and State of Illinois, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in piston rod packing,—the object of the invention being to provide simple and efficient means for permitting a lateral or rocking motion to the piston rod and preserve a steam tight joint to prevent any leakage of steam and to obviate any uneven strain or wear on the packing.

With this object in view the invention consists in certain novel features of construction and combinations and arrangements of parts as hereinafter set forth and pointed out in the claims.

In the accompanying drawings: Figure 1 is a sectional view illustrating my improvements. Fig. 2 is a view of a modification.

A represents the gland and B the piston rod,—a shell $a$ being preferably attached to the gland where the piston rod passes through it, for containing a lubricating swab $b$.

The gland A is made with an annular recess C for the accommodation of a sleeve D which surrounds the piston rod B, said sleeve being of a size not sufficient to fill said recess and rest against the walls thereof. Another recess C' is made in the rear face of the gland A, and into this recess a collar or annular flange E on the sleeve D projects. The front or forward face $c$ of the ring or annular flange E is rounded and bears against the rounded face $c'$ of a ring F located in the recess C' and having its bearing on the front wall thereof,—this construction and arrangement of parts constituting a ball joint and permitting the piston rod to have a limited lateral or rocking movement commensurate with the uneven operation of the cross head of the engine. The rear face of the ring or annular flange E is made straight or at right angles to the sleeve D, for a short distance, as at $d$, and the remainder of said rear face of the ring or flange is curved, as at $e$,—said curved face $e$ being adapted to bear and move on the end of the stuffing box G, thus permitting the proper rocking or lateral movement of the piston rod without allowing any endwise movement of the sleeve,—the construction and arrangement of parts also serving to retain the ground faces $c, c'$ constantly in proper contact.

In many cases the stuffing boxes of locomotives are so shallow or so small in diameter that there is no room to run the sleeve back into the stuffing box. In such cases I prefer to locate the sleeve forward in the gland and allow its rear end to project over the stuffing box, as shown in Fig. 2.

Within the sleeve D and surrounding the piston rod B are packing rings H, and behind these, a follower I is located and forced against the packing rings with a yielding pressure by means of a coiled spring J.

My improvements are very simple, will permit a free lateral or rocking motion to the piston rod commensurate with the uneven operation of the cross head of the engine without throwing the ground seats apart or in any manner injuring them, and are effectual, in every respect, in the performance of their functions.

Having fully described my invention, what I claim as new, and desire to secure by Letters Patent, is—

1. In a piston rod packing, the combination with a gland and a stuffing box, of a sleeve, and an annular flange projecting from said sleeve, said annular flange having a curved forward face adapted to bear within the gland, and a curved rear face adapted to bear on the stuffing box, whereby to permit a rocking or lateral motion to the piston rod passing through said sleeve, substantially as set forth.

2. In a piston rod packing, the combination with a gland and a stuffing box, of a ring located in the gland and having a curved face, a sleeve, and an annular flange projecting from said sleeve, said annular flange having a curved forward face adapted to bear on the curved face of said ring, and a curved rear face adapted to bear and have a rocking movement on the stuffing box, substantially as set forth.

3. In a piston rod packing, the combination with a recessed gland and a stuffing box, of a sleeve adapted to enter said recess in the gland, and an annular flange projecting from said sleeve said annular flange having a curved front face adapted to bear within the gland and a rear curved face adapted to bear and have a rocking movement on the stuffing box, substantially as set forth.

4. In a piston rod packing, the combination with a gland stuffing box and a sleeve, said gland having a recess to admit said sleeve, of an annular flange on said sleeve, said gland being provided with a recess in its rear face to admit said flange, a ring having a curved face, located in said last mentioned recess in the gland, said annular flange having a curved front face to bear and having a rocking movement on the curved face of said ring, and a curved rear face adapted to bear and have a rocking movement on the stuffing box, substantially as set forth.

5. In a piston rod packing, the combination with a gland and a stuffing box, of a sleeve and an annular flange projecting from said sleeve, said annular flange having a curved forward face adapted to bear within the gland, a portion of the rear face of said annular flange being straight and a portion curved, the curved portion being adapted to bear and have a rocking movement on the stuffing box, substantially as set forth.

6. In a piston rod packing, the combination with a stuffing box and a gland secured thereto, one of said parts provided with an annular recess or cavity, said recess or cavity of greater depth adjacent to the joint formed between the two parts whereby a shoulder is formed between the two recesses, of a sleeve adapted to enter one recess and provided with a flange which enters the deeper recess, said flange provided with a curved outer face, and a ring interposed between the curved face of the flange and the shoulder, whereby to take all strain from the outer end of the gland, substantially as set forth.

In testimony whereof I have signed this specification in the presence of two subscribing witnesses.

CHARLES C. JEROME.

Witnesses:
   GEO. C. JEROME,
   A. B. ELLIOTT.